United States Patent Office 3,016,329
Patented Jan. 9, 1962

3,016,329
ATTRACTANTS FOR THE MALE MEDITER-
RANEAN FRUIT FLY
Morton Beroza, 17 E. Ridge Road, Greenbelt, Md., and
Nathan Green, 1805 Duke Drive, and Samuel I. Gert-
ler, 8500 16th St., both of Silver Spring, Md.
No Drawing. Filed Aug. 6, 1959, Ser. No. 832,123
24 Claims. (Cl. 167—48)
(Granted under Title 35, U.S. Code (1952) sec. 266)

A non-exclusive, irrevocable, royalty-free license in the invention herein described, throughout the world for all purpose of the United States Government, with the power to grant sublicenses for such purpose, is hereby granted to the Government of the United States of America.

The patent rights for the United States in any invention in the patent to be granted on this application are dedicated to the public.

This invention relates to certain organic esters, processes for their preparation, and methods for their use for controlling infestation of the male Mediterranean fruit fly. The invention has among its objects the provision of these esters in economical production and high yield and their use as attractants for the said fruit fly under low, normal, and high temperatures. Other objects will be apparent from the description of the invention.

Mediterranean fruit flies or Medflies of the species *Ceratitis capitata* which occurs in tropical and sub-tropical areas and constitutes a very serious pest affecting citrus fruit and various vegetables. In some parts of the world damage caused by these flies during the course of a season has been estimated to amount to millions of dollars.

In order to effect control of the Mediterranean fruit fly, it is necessary to locate the area and determine the degree of infestation. This may be done by setting out traps in suspected areas and placing inside the traps a substance which acts as a bait or attractant for the flies.

The compounds of the instant invention are such attractants. The bait may be applied with an inert carrier or it may be mixed with a toxicant which kills all of the flies entering the trap. By counting the number of trapped flies it is possible to estimate the degree of infestation of a given area.

The esters of the invention are the aliphatic esters of 4(or 5)-chloro (or bromo)-hexahydro-o-toluic acid and may be represented by the formula

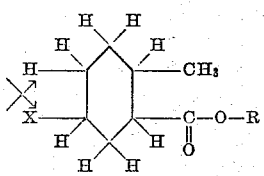

wherein R is an aliphatic radical containing from 2 to 5 carbon atoms, such as an alkyl radical like ethyl, propyl, isopropyl, and sec-butyl, and an alkenyl radical like allyl, and X is a chlorine or bromine atom. Examples of such esters are ethyl 4(or 5)-chlorohexahydro-o-toluate, propyl 4(or 5)-chlorohexahydro-o-toluate, isopropyl 4(or 5)-chlorohexahydro-o-toluate, sec-butyl 4(or 5)-chlorohexahydro-o-toluate, tert-butyl 4(or 5)-chlorohexahydro-o-toluate, ethyl 4(or 5)-bromohexahydro-o-toluate, propyl 4(or 5)-bromohexahydro-o-toluate, isopropyl 4(or 5)-bromohexahydro-o-toluate, sec-butyl 4(or 5)-bromohexahydro-o-toluate, allyl 4(or 5)-chlorohexahydro-o-toluate, and allyl 4(or 5)-bromohexahydro-o-toluate.

The esters of the invention are prepared by heating trans-6-methyl-3-cyclohexene-1-carboxylic acid with about an equal weight of dioxane and an excess, preferably about a 4-fold molar excess, based on the weight of the said cyclohexene carboxylic acid, of a concentrated hydrohalic acid selected from the group consisting of hydrochloric acid nad hydrobromic acid, to produce the corresponding 4(or 5)-halohexahydro-o-toluic acid, that is, 4(or 5)-chlorohexahydro-o-toluic acid, or 4(or 5)-bromohexahydro-o-toluic acid, the heating being carried out at elevated temperatures, preferably being conducted at about 100° C. for about 6 hours with vigorous mixing.

The 4(or 5)-halohexahydro-o-toluic acid, prepared as described above, is then converted to the acid halide by the use of conventional halogenating agents, such as thionyl chloride, phosphorus trichloride, and phosphorus tribromide, at a temperature not exceeding about 100° C., preferably at about room temperature, and the acid halide then reacted with corresponding aliphatic alcohol in the presence or absence of an organic amine acid acceptor, preferably in the presence of an organic amine acid acceptor, such as pyridine, at a temperature below about 35° C., preferably about room temperature, to produce an ester of the above formula wherein R has the significance stated above.

The preparation of sec-butyl 4(or 5)-chlorohexahydro-o-toluate, which is typical of the preparation of the esters of the invention, is illustrated hereafter.

A mixture of 56 grams of trans-6-methyl-3-cyclohexene-carboxylic acid (as prepared by O. Diels and K. Alder, Ann., 470, 88–92 (1929)), 60 ml. dioxane and 148 ml. of concentrated hydrochloric acid in a sealed bottle was heated at 95° C. for six hours with vigorous agitation. About 300 ml. of water was added and after cooling, the crystallized product was filtered off and the filtrate extracted with benzene. Removal of the solvent gave 68.7 grams (97%) of the 4(or 5)-chlorohexahydro-o-toluic acid, M.P. 73°–83° C.

The 4(or 5)-chlorohexahydro-o-toluic acid, prepared as described above, was converted to the ester via the acid halide route as follows: A total of 68 grams of the acid was dissolved in 100 ml. of benzene and 42.6 ml. of thionyl chloride (phosphorus trichloride or tribromide may be used in place of thionyl chloride) was added. The mixture was allowed to stand overnight at room temperature. The benzene and thionyl chloride were removed under water pump vacuum and the residue, dissolved in 50 ml. benzene, was added slowly to a cold, stirred solution of 40 ml. sec-butyl alcohol, 100 ml. benzene and 40 ml. pyridine. After standing one hour the mixture was worked up by adding 100 ml. ether, washing with water, 10% $Na_2CO_3$, dilute HCl, and again with water. The solvent was evaporated and the residue distilled at 80–82° C., at 0.3 mm. The yield was 65.4 grams of ester having a pleasant fruity odor. Refractive index $(n_D^{25})$ 1.4588. Chlorine analysis: calc. for $C_{12}H_{21}ClO_2$ 15.23%; found, 14.88%.

One of the novel features of the foregoing synthesis resides in the preparation of the 4 (or 5)-chlorohexahydro-o-toluic acid. Practically complete addition of hydrogen chloride to the unsaturated acid is accomplished only under forcing conditions and then only in the presence of a solvent that causes better mixing or higher miscibility of the concentrated hydrochloric acid and the unsaturated acid. This effect is promoted by the dioxane and vigorous mixing. Yet the conditions of hydrogen ch'oride addition cannot be too drastic or the yield of product will be lowered and its attractiveness lessened; for example, these effects result if the reaction time of 6 hours for preparing the chloroacid is raised to 16 hours. The chloroacid can also be prepared by heating at elevated temperatures for intervals shorter than 6 hours, as for example, at 160° C., for 2 hours, but high pressures are developed so that commercially such treatment would require special equipment and wou'd therefore be uneconomical. Attempts to leave out the dioxane resulted in much lower yields of product. The usual means of adding gaseous hydrogen chloride to an unsaturated compound in an organic solvent in the cold or at room temperature results in only partial addition.

Another feature of this synthesis relates to the mild conditions employed for the preparation of the ester. The esterification is preferably carried out at room temperature or below to avoid isomerization of the trans configuration existing between the methyl and carboxy groups of the acid. It should be noted that 8 stereoisomers are possible for each of the esters and the method of preparing them is important in order to obtain a product highly attractive to the Medfly. The "4 (or 5)" terminology has been emphasized to designate that a mixture of these isomers is obtained in the preparation of the ester.

Although the acid halide route was found best for this synthesis, we do not limit this invention to the compounds being prepared in this manner. Azeotropic esterification, for instance, has been employed successfully.

The esters of the invention are readily synthesized, as described above, can be produced economically, in unlimited quantities, and in good yield.

In order to determine the effectiveness of the esters they were tested in a cage olfactometer. This consists of a large chamber, from the ceiling of which a rotating rack is suspended. From the rack there are suspended a number of invaginated flasks, usually twelve. Some of these flasks contain water, while other flasks contain a water emulsion of 0.01 to 0.1 percent of the ester to be tested. A number of flies are placed in the chamber and allowed to fly around freely. After a definite period of time the number of flies entering each of the flasks, acting as traps, is counted. The olfactometer rating is obtained by dividing the number of flies attracted by the ester by the number attracted by the water.

The physical constants and the olfactometer rating found for some of the esters of this invention are set forth in the following table.

| Ester | Olfactometer Rating | B.P., ° C./mm. | $n_D^{25}$ |
|---|---|---|---|
| Ethyl 4 (or 5)-chlorohexahydro-o-toluate | 79 | 86–89/1.3 | 1.4606 |
| Propyl 4 (or 5)-chlorohexahydro-o-toluate | >50 | 106–109/0.3 | 1.4629 |
| Isopropyl 4 (or 5)-chlorohexahydro-o-toluate | 70 | 86–89/1.0 | 1.4551 |
| Sec-butyl 4 (or 5)-chlorohexahydro-o-toluate | 72 | 80–82/0.3 | 1.4588 |
| Tert-butyl 4 (or 5)-chlorohexahydro-o-toluate | 63 | 90–92/0.6 | 1.4570 |
| Allyl 4 (or 5)-chlorohexahydro-o-toluate | >50 | 98–101/0.35 | 1.4751 |
| Ethyl 4 (or 5)-bromohexahydro-o-toluate | 73 | 102–110/0.3 | 1.4831 |
| Propyl 4 (or 5)-bromohexahydro-o-toluate | 168 | 86–87/0.35 | 1.4788 |
| Isopropyl 4 (or 5)-bromohexahydro-o-toluate | 75 | 100–108/0.4 | 1.4751 |
| Sec-butyl 4 (or 5)-bromohexahydro-o-toluate | 30 | 110–115/0.1 | 1.4760 |
| Allyl 4 (or 5)-bromohexahydro-o-toluate | | 95–100/0.7 | 1.4881 |

In a test to determine duration of effectiveness, 0.5 ml. of "siglure," the sec-butyl ester of 6-methyl-3-cyclohexene-1-carboxylic acid (described in U.S. Patent No. 2,851,392 and now conventionally used as a Medfly lure), and the sec-butyl 4(or 5)-chlorohexahydrotoluate were each placed on a cotton wick and tested for attractiveness to Medflies each day. "Siglure" was attractive for only two days, the toluate for 40 days. Yet surprisingly, even though the toluate is much less volatile than "siglure," it is much more effective than "siglure" at low temperatures when one would expect its lower volatility to be disadvantageous. Thus in a representative experiment of 8 weeks duration using 5 replicate traps in cool areas, 24 ml. "siglure," applied at 6 ml. biweekly, caught 5163 flies and a single 6 ml. application of the toluate caught 9696 flies. At normal temperatures over a 12-day period 3 ml. of "siglure" caught 1266 flies while the toluate caught 2243 flies in an experiment using ten replicates. The toluate was also more effective than "siglure" at higher temperature, since at such temperature, (e.g. in a tropical country such as Costa Rica) the "siglure" is effective for a very short time due to its rapid volatilization.

The esters of this invention can be used in actual practice in the field in baited traps either as an aqueous emulsion or as impregnated in a small roll of absorbent material, such as a dental roll. They can also be used in admixture with substances known to be toxic to the fruit fly, such as parathion, malathion, DDVP (dimethyl 2,2-dichlorovinyl phosphate), lindane, dieldrin, aldrin and the like. However, like angelica seed oil and "siglure," (conventional Medfly lures) these esters attract predominantly the male. Baited traps can be used as a method of control in isolated areas, such traps, for example, being disclosed by Steiner et al. in the Journal of Economic Entomology, vol. 50, pages 508–509, August 1957. In heavily infested areas supplementary control measures such as spraying insecticides from the air would be even more effective.

What is claimed is:

1. A mixture containing an aliphatic 4-halohexahydro-o-toluate having the formula

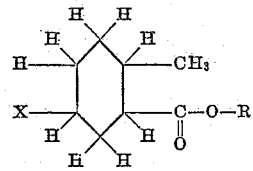

and an aliphatic 5-halohexahydro-o-toluate having the formula

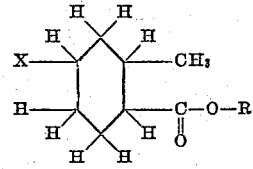

wherein R is an aliphatic radical selected from the group consisting of an allyl radical and an alkyl radical containing from 2 to 5 carbon atoms, and X is a halogen selected from the group consisting of chlorine and bromine, said X in each of said formulas being identical.

2. A mixture containing propyl 4-chlorohexahydro-o-toluate and propyl 5-chlorohexahydro-o-toluate.

3. A mixture containing isopropyl 4-chlorohexahydro-o-toluate and isopropyl 5-chlorohexahydro-o-toluate.

4. A mixture containing sec-butyl 4-chlorohexahydro-o-toluate and sec-butyl 5-chlorohexahydro-o-toluate.

5. A mixture containing tert-butyl 4-chlorohexahydro-o-toluate and tert-butyl 5-chlorohexahydro-o-toluate.

6. A mixture containing ethyl 4-bromohexahydro-o-toluate and ethyl 5-bromohexahydro-o-toluate.

7. A process comprising heating trans-6-methyl-3-cyclohexene-1-carboxylic acid with about an equal weight of dioxane and an excess, based on the weight of said cyclohexene carboxylic acid, of a concentrated hydrohalic acid selected from the group consisting of hydrochloric acid and hydrobromic acid at an elevated temperature to produce a mixture containing a 4-halohexahydro-o-toluic acid having the formula

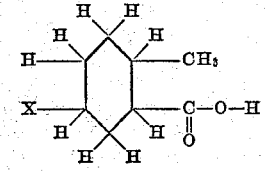

and a 5-halohexahydro-o-toluic acid having the formula

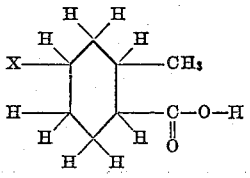

wherein X is a halogen selected from the group consisting of chlorine and bromine, said X in each of said formulas being identical, heating the said mixture of halohexahydro-o-toluic acids with a halogenating agent at a temperature not exceeding about 100° C. to convert the said mixture of acids to the corresponding acid halides, and heating the resulting mixture of acid halides with an aliphatic alcohol of the formula ROH wherein R is an aliphatic radical selected from the group consisting of an allyl radical and an alkyl radical containing from 2 to 5 carbon atoms, at a temperature below about 35° C. to produce a mixture containing an aliphatic 4-halohexahydro-o-toluate having the formula

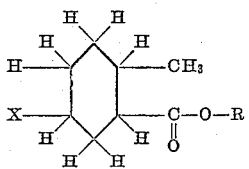

and an aliphatic 5-halohexahydro-o-toluate having the formula

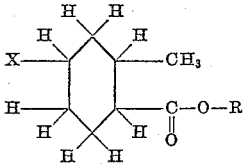

wherein R is an aliphatic radical selected from the group consisting of an allyl radical and an alkyl radical containing from 2 to 5 carbon atoms, and X is a halogen selected from the group consisting of chlorine and bromine, said X in each of said formulas being identical.

8. The process of claim 7 wherein the hydrohalic acid is hydrochloric acid.

9. The process of claim 7 wherein the hydrohalic acid is hydrobromic acid.

10. The process of claim 8 wherein the alcohol is propyl alcohol.

11. The process of claim 8 wherein the alcohol is isopropyl alcohol.

12. The process of claim 8 wherein the alcohol is sec-butyl alcohol.

13. The process of claim 8 wherein the alcohol is tert-butyl alcohol.

14. The process of claim 9 wherein the alcohol is ethyl alcohol.

15. A process comprising heating trans-6-methyl-3-cyclohexene-1-carboxylic acid with about an equal weight of dioxane and an excess, based on the weight of said cylohexene carboxylic acid, of a concentrated hydrohalic acid selected from the group consisting of hydrochloric acid and hydrobromic acid at an elevated temperature to produce a mixture containing a 4-halohexahydro-o-toluic acid having the formula

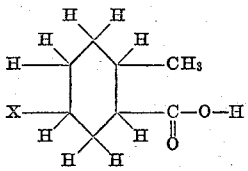

and a 5-halohexahydro-o-toluic acid having the formula

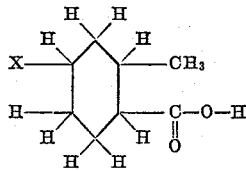

wherein X is a halogen selected from the group consisting of chlorine and bromine, said X in each of said formulas being identical.

16. The proces of claim 15 wherein the hydrohalic acid is hydrochloric acid.

17. The process of claim 15 wherein the hydrohalic acid is hydrobromic acid.

18. A method comprising baiting a trap with a mixture containing an aliphatic 4-halohexahydro-o-toluate having the formula

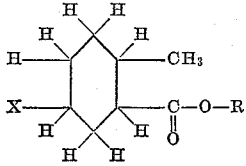

and an aliphatic 5-halohexahydro-o-toluate having the formula

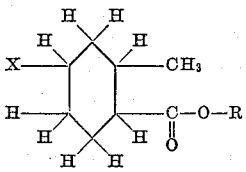

wherein R is an aliphatic radical selected from the group consisting of an allyl radical and an alkyl radical containing from 2 to 5 carbon atoms, and X is a halogen selected from the group consisting of chlorine and bromine, said X in each of said formulas being identical, to attract the male Mediterranean fruit fly.

19. A method comprising baiting a trap with a mixture containing propyl 4-chlorohexahydro-o-toluate and propyl 5-chlorohexahydro-o-toluate to attract the male Mediterranean fruit fly.

20. A method comprising baiting a trap with a mixture containing isopropyl 4-chlorohexahydro-o-toluate and isopropyl 5-chlorohexahydro-o-toluate to attract the male Mediterranean fruit fly.

21. A method comprising baiting a trap with a mixture containing sec-butyl 4-chlorohexahydro-o-toluate and sec-butyl 5-chlorohexahydro-o-toluate to attract the male Mediterranean fruit fly.

22. A method comprising baiting a trap with a mixture containing tert-butyl 4-chlorohexahydro-o-toluate and tert-butyl 5-chlorohexahydro-o-toluate to attract the male Mediterranean fruit fly.

23. A method comprising baiting a trap with a mixture containing ethyl 4-bromohexahydro-o-toluate and ethyl 5-bromohexahydro-o-toluate to attract the male Mediterranean fruit fly.

24. A method comprising baiting a trap with a mixture containing an aliphatic 4-halo hexahydro-o-toluate having the formula

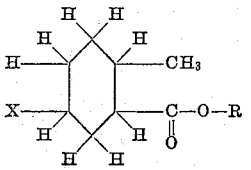

and an aliphatic 5-halohexahydro-o-toluate having the formula

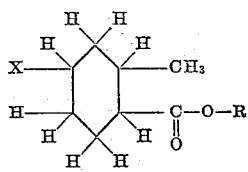

wherein R is an aliphatic radical selected from the group consisting of an allyl radical and an alkyl radical containing from 2 to 5 carbon atoms, and X is a halogen selected from the group consisting of chlorine and bromine, said X in each of said formulas being identical, to attract the male Mediterranean fruit fly, and containing also a toxicant for the said male Mediterranean fruit fly.

References Cited in the file of this patent
UNITED STATES PATENTS
2,851,392    Gertler _____ Sept. 9, 1958

OTHER REFERENCES
Chem. Eng. News, April 15, 1957, pp. 80, 81.